US009062975B2

(12) United States Patent
 Suyama

(10) Patent No.: US 9,062,975 B2
(45) Date of Patent: Jun. 23, 2015

(54) CARRIER

(71) Applicant: MURATA MACHINERY, LTD., Kyoto-shi, Kyoto (JP)

(72) Inventor: Norihiko Suyama, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 165 days.

(21) Appl. No.: 13/709,088

(22) Filed: Dec. 10, 2012

(65) Prior Publication Data

US 2013/0204482 A1    Aug. 8, 2013

(30) Foreign Application Priority Data

Feb. 8, 2012   (JP) ................................. 2012-024903

(51) Int. Cl.
  *G05D 1/00*   (2006.01)
  *G06F 19/00*  (2011.01)
  *G01C 21/00*  (2006.01)
  *G05D 1/02*   (2006.01)

(52) U.S. Cl.
  CPC ............ *G01C 21/005* (2013.01); *G05D 1/0244* (2013.01); *G05D 1/0274* (2013.01); *G05D 2201/0216* (2013.01)

(58) Field of Classification Search
  CPC . G01C 21/005; G05D 1/0231; G05D 1/0257; G05D 1/0244; G05D 1/0274; G05D 2201/0216
  USPC .................. 701/13, 23, 28, 50, 446
  See application file for complete search history.

(56) References Cited

U.S. PATENT DOCUMENTS

| 4,494,200 | A | * | 1/1985 | Lam .............................. 701/521 |
| 4,653,002 | A | * | 3/1987 | Barry ............................. 701/23 |
| 4,796,198 | A | * | 1/1989 | Boultinghouse et al. ....... 701/23 |
| 4,815,008 | A | * | 3/1989 | Kadonoff et al. .............. 701/23 |
| 5,051,906 | A | * | 9/1991 | Evans et al. .................... 701/28 |
| 5,341,437 | A | * | 8/1994 | Nakayama .................... 382/104 |
| 5,390,118 | A | * | 2/1995 | Margolis et al. ................ 701/23 |
| 5,911,767 | A | * | 6/1999 | Garibotto et al. ............... 701/28 |
| 5,938,710 | A | * | 8/1999 | Lanza et al. .................... 701/50 |
| 6,629,028 | B2 | * | 9/2003 | Paromtchik et al. ............ 701/23 |
| 6,879,878 | B2 | * | 4/2005 | Glenn et al. ................... 700/245 |

(Continued)

FOREIGN PATENT DOCUMENTS

| JP | 08-152323 A | 6/1996 |
| JP | 2010-086416 A | 4/2010 |
| JP | 2011-253414 A | 12/2011 |

*Primary Examiner* — Fadey Jabr
*Assistant Examiner* — Angelina Shudy
(74) *Attorney, Agent, or Firm* — Keating & Bennett, LLP

(57) ABSTRACT

A carrier which automatically travels on a pathway. A carrier comprising: a carrier main body which travels on the pathway including a first area and a second area other than the first area; a distance measuring sensor which is provided in the carrier main body, measures an intensity of reflected light a plurality of times, and obtains a plurality of pieces of measured data; a map data storage unit which stores map data in which structures provided along the pathway are recorded; an approximate line calculation unit which calculates an approximate line based on a set of pieces of measured data having the light intensity equal to or more than a predetermined threshold among the plurality of pieces of measured data in the first area and calculates the approximate line based on the set of the plurality of pieces of measured data in the second area; and a position calculation unit which calculates a position of the carrier main body by collating the approximate line and the map data.

8 Claims, 12 Drawing Sheets

(56) References Cited

U.S. PATENT DOCUMENTS

| | | | |
|---|---|---|---|
| 7,684,916 B2* | 3/2010 | Wei et al. | 701/50 |
| 7,765,027 B2* | 7/2010 | Hong et al. | 700/245 |
| 7,792,622 B2* | 9/2010 | Wei et al. | 701/50 |
| 7,916,898 B2* | 3/2011 | Anderson | 382/104 |
| 2002/0099481 A1* | 7/2002 | Mori | 701/23 |
| 2006/0074532 A1* | 4/2006 | Hong | 701/28 |
| 2007/0005208 A1* | 1/2007 | Han et al. | 701/50 |
| 2007/0271013 A1* | 11/2007 | Jochem et al. | 701/28 |
| 2011/0066313 A1* | 3/2011 | Larsson et al. | 701/25 |
| 2011/0153139 A1* | 6/2011 | Erb et al. | 701/28 |
| 2011/0178669 A1 | 7/2011 | Tanaka et al. | |
| 2011/0270518 A1* | 11/2011 | Nguyen | 701/201 |
| 2011/0301800 A1 | 12/2011 | Furuno et al. | |
| 2012/0101695 A1* | 4/2012 | Han et al. | 701/50 |
| 2012/0239239 A1* | 9/2012 | Suyama | 701/25 |
| 2013/0054129 A1* | 2/2013 | Wong et al. | 701/408 |

* cited by examiner

FIG. 8A  FIG. 8B  FIG. 8C
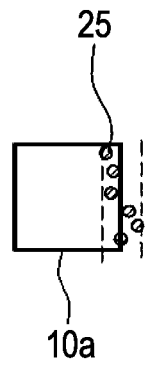
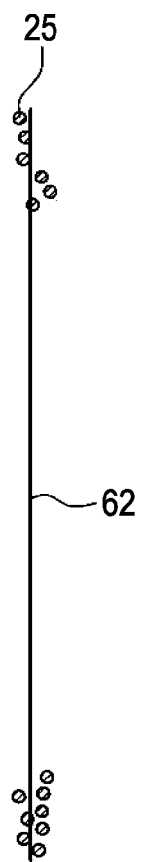
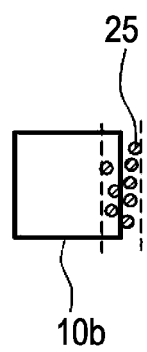

CARRIER

BACKGROUND OF THE INVENTION

1. Field of the Invention

The present invention relates to a carrier, and more particularly, to a carrier which automatically travels on a pathway.

2. Description of the Related Art

In the related art, a carrier which automatically travels on a pathway is known. For example, the carrier includes an environmental map storage unit, a distance measuring sensor, and a control unit.

The environmental map storage unit stores an environmental map which indicates a region in which structures configuring the pathway are present and a region in which the structures are not present. For example, the distance measuring sensor is provided in the front of the carrier and scans laser light over a range of 270° of the front of the carrier. Thereby, the distance measuring sensor obtains positional data of reflectors based on the reflected light from the structures which configure the pathway and obtains pathway information. The control unit performs calculation of the position of the carrier by collating the environmental map and the obtained path information (for example, refer to JP 2010-86416A).

For example, in a warehouse or the like, loads are placed at locations other than the pathway on which the carrier travels. Since the distance measuring sensor detects the reflected light from all obstacles, the distance measuring sensor also detects the reflected light from the loads in addition to the structures of the pathway. Thereby, the positional data of the reflectors are different according to presence or absence of the loads or differences of shapes of the loads, and in this case, the pathway information cannot be correctly obtained. As a result, the position of the carrier cannot be correctly obtained.

SUMMARY OF THE INVENTION

An object of the present invention is to correctly obtain a position of a carrier in which the position is known by detecting reflected light through a distance measuring sensor.

Hereinafter, a plurality of aspects are described as means for solving the above-described problems. These aspects may be combined as desired according to necessity.

A carrier according to an aspect of the present invention includes a carrier main body, a distance measuring sensor, a map data storage unit, an approximate line calculation unit, and a position calculation unit.

The carrier main body travels on a pathway including a first area and a second area other than the first area.

The distance measuring sensor is provided in the carrier main body, measures an intensity of reflected light a plurality of times, and obtains a plurality of pieces of measured data.

The map data storage unit stores map data in which structures provided along the pathway are recorded.

The approximate line calculation unit calculates an approximate line based on a set of pieces of measured data having the light intensity equal to or more than a predetermined threshold among the plurality of pieces of measured data in the first area and calculates the approximate line based on the set of the plurality of pieces of measured data in the second area.

The position calculation unit calculates a position of the carrier main body by collating the approximate line and the map data.

The pathway includes the first area and the second area other than the first area.

For example, the first area may be an area in which the peripheral environment of the pathway is easily changed and which is between racks for placing loads. Since various large and small loads are put in and out the rack, the peripheral environment of the pathway is changed according to the presence or absence of the load, the size of the load, and the like in the first area. Thereby, the measured data obtained by the distance measuring sensor may also be changed at the time of the measurement according to the peripheral environment such as the load. Therefore, for example, a reflecting plate which reflects the light with an intensity equal to or more than the predetermined threshold is provided along the pathway in the first area.

In the first area in which the peripheral environmental is easily changed, the approximate line calculation unit calculates the approximate line based on the set of the pieces of measured data which have an intensity equal to or more than the predetermined threshold. That is, when the carrier travels on the first area, the approximate line calculation unit calculates the approximate line based on only the measured data which detects the reflected light from the reflecting plate. Even when the peripheral environment of the pathway is changed according to the presence or absence of the load, the size of the load, and the like, the reflected light from the reflecting plate is not easily subjected to the influence due to the change of the peripheral environment. In this way, since the approximate line which indicates the pathway is calculated by only the measured data which is not easily subjected to the influence of the peripheral environment, the pathway information can be correctly calculated.

On the other hand, for example, the second area may be an area in which the change of the peripheral environment of the pathway is small and which includes the wall and the like. The reflecting plate is not provided in the second area, and the light is reflected with an intensity smaller than the predetermined threshold. Moreover, when the carrier travels on the second area, the approximate line calculation unit calculates the approximate line based on all the pieces of measured data which are measured by the distance measuring sensor. Compared to the first area, the change of the peripheral environment is smaller in the second area, and it is not necessary to limit the measured data for calculating the approximate line to predetermined data.

As described above, since the approximate line is calculated in each of the first area and the second area, the approximate line having high accuracy according to the peripheral environment can be calculated. Therefore, pathway information is correctly obtained even when the peripheral environment is changed, and the position of the carrier main body can be correctly calculated.

The set of the pieces of measured data having the light intensity equal to or more than the predetermined threshold may include a plurality of small sets which are separated from one another, and at least one of the measured data may be included in each small set.

When the approximate line is calculated using only one small set, one point of measured data greatly influences the extension direction of the approximate line, that is, the inclination. This is because only limited range of measured data with respect to the extension direction of the approximate line is included in one small set. Thereby, even when only one of the measured data has an error, the approximate line has a great error. Therefore, in order to solve the above-described problems, in the carrier according to the aspect of the present invention, the approximate line is calculated using the plurality of small sets which are separated from one another and using the measured data included in each of the small sets. In this way, since the plurality of pieces of measured data having the positions separated from one another are used, the influence of the measured data having errors to the inclination of the approximate line is decreased, and accuracy of the approximate line can be improved.

A plurality of structures may be provided along the pathway in the first area, and a reflecting plate which reflects the light with an intensity equal to or more than the predetermined threshold may be provided on each structure.

For example, the structure may be the columns of the rack which are provided with a predetermined interval. The approximate line calculation unit calculates the approximate line based on the measured data from the reflecting plate which is provided on each structure. The approximate line indicates the positional data of the structure. The position calculation unit can calculate the position of the carrier main body by collating the approximate line which indicates the positional data of the structure and the map data which records the structure.

The reflecting plate may be provided only on a surface opposite to the first area of the structure.

The reflecting plate is provided at least on the surface opposite to the first area. Thereby, the reflected light which is reflected by the reflecting plate and has an intensity equal to or more than the predetermined threshold can be detected in the first area. Moreover, the measured data of the light reflected by the reflecting plate is selected among the plurality of pieces of measured data based on the predetermined threshold and can be used for the calculation of the approximate line. On the other hand, since all the pieces of measured data are used for the calculation of the approximate line in the second area, it is not necessary to select the measured data based on the predetermined threshold.

In the carrier according to the present invention, the position of the carrier can be correctly obtained.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 4A is an enlarged view of a column 10a, FIG. 4B is an enlarged view of a column 10b, and FIG. 4C is an enlarged view of a column 10d;

FIG. 7A is the explanatory view illustrating small sets of the measured data, and FIG. 7B is the explanatory view illustrating the approximate line of each of the small sets;

FIGS. 8A to 8C are explanatory views explaining an error of the approximate line in the first area A, FIG. 8A is a relationship view between the column and the measured data, FIG. 8B is the approximate line for each column, and FIG. 8C is the approximate line corresponding to a plurality of columns;

DETAILED DESCRIPTION OF PREFERRED EMBODIMENTS (1) Carrier System (1-1) Overall Configuration A configuration of a carrier system will be described with reference to FIGS. 1 and 2. FIG. 1 is a plan view of the carrier system. FIG. 2 is an explanatory view illustrating a state where loads are placed on rack.

Figure 1:
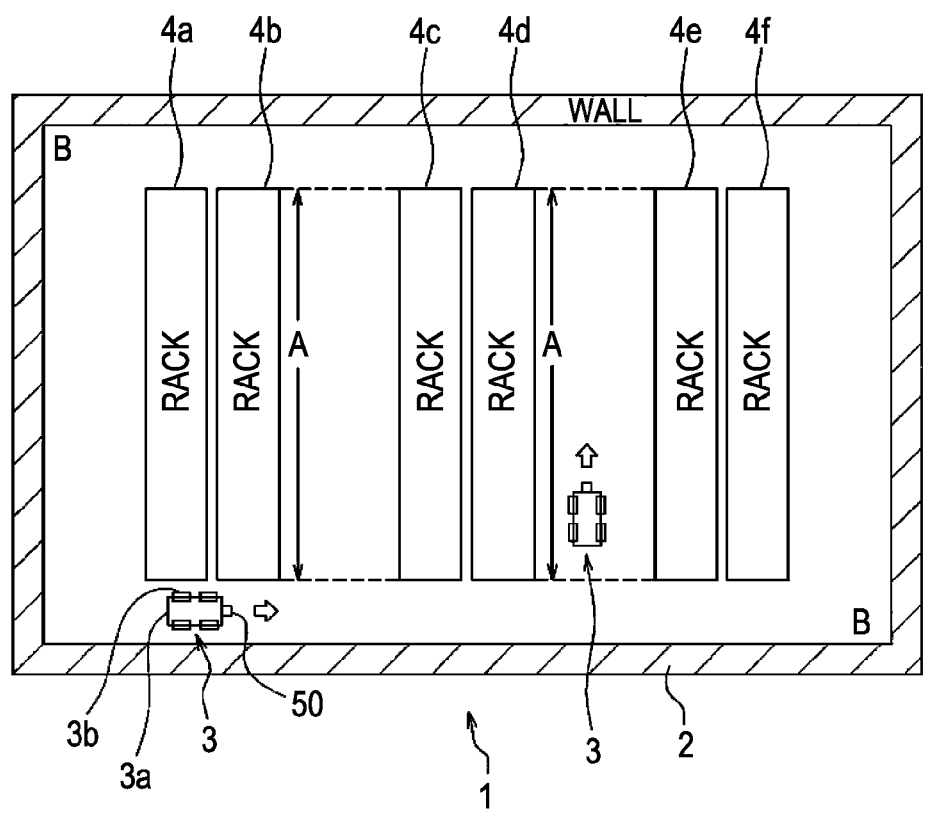
FIG. 1 is a plan view of a carrier system.

For example, a carrier system 1 is provided in a room which is surrounded by a wall 2 as illustrated in FIG. 1. The carrier system 1 includes a rack 4 (4a, 4b, 4c, 4d, 4e, and 4f) for placing the loads, a first and second areas A and B, and a carrier 3 which travels on the first and second areas A and B.

Figure 2:
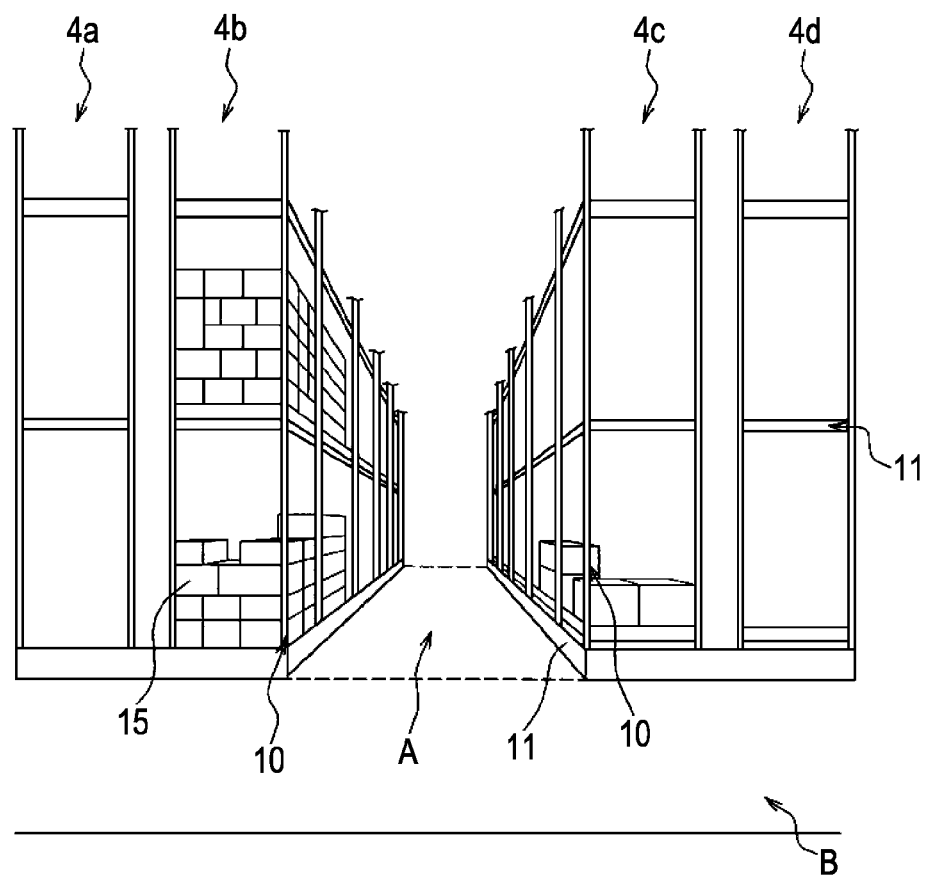
FIG. 2 is an explanatory view illustrating a state where loads are placed on a rack.

For example, the rack 4 is disposed so that two racks 4 are one set. In FIG. 1, the rack 4a and the rack 4b are adjacent to each other and are disposed as one set. Similarly, the rack 4c and the rack 4d are disposed as one set, and the rack 4e and the rack 4f are disposed as one set. As illustrated in FIG. 2, a plurality of columns 10 and floor plates 11 are combined, and thereby, the rack 4 is configured so that a plurality of steps of storage shelves are formed in vertical and horizontal directions. Various large and small loads 15 are placed on the storage shelves.

The first area A and the second area B are a pathway on which the carrier 3 travels. In the present preferred embodiment, the first area A is between the racks 4, and the second area B is between the rack 4 and the wall 2. Putting in and out of the load to the rack 4 is performed by the carrier 3 which travels on an area which the rack 4 faces. For example, the rack 4b faces the first area A, and putting in and out of the load 15 is performed by the carrier 3 which travels on the first area A. On the other hand, the rack 4a faces the second area B, and putting in and out of the load 15 is performed by the carrier 3 which travels on the second area B.

Figure 5:
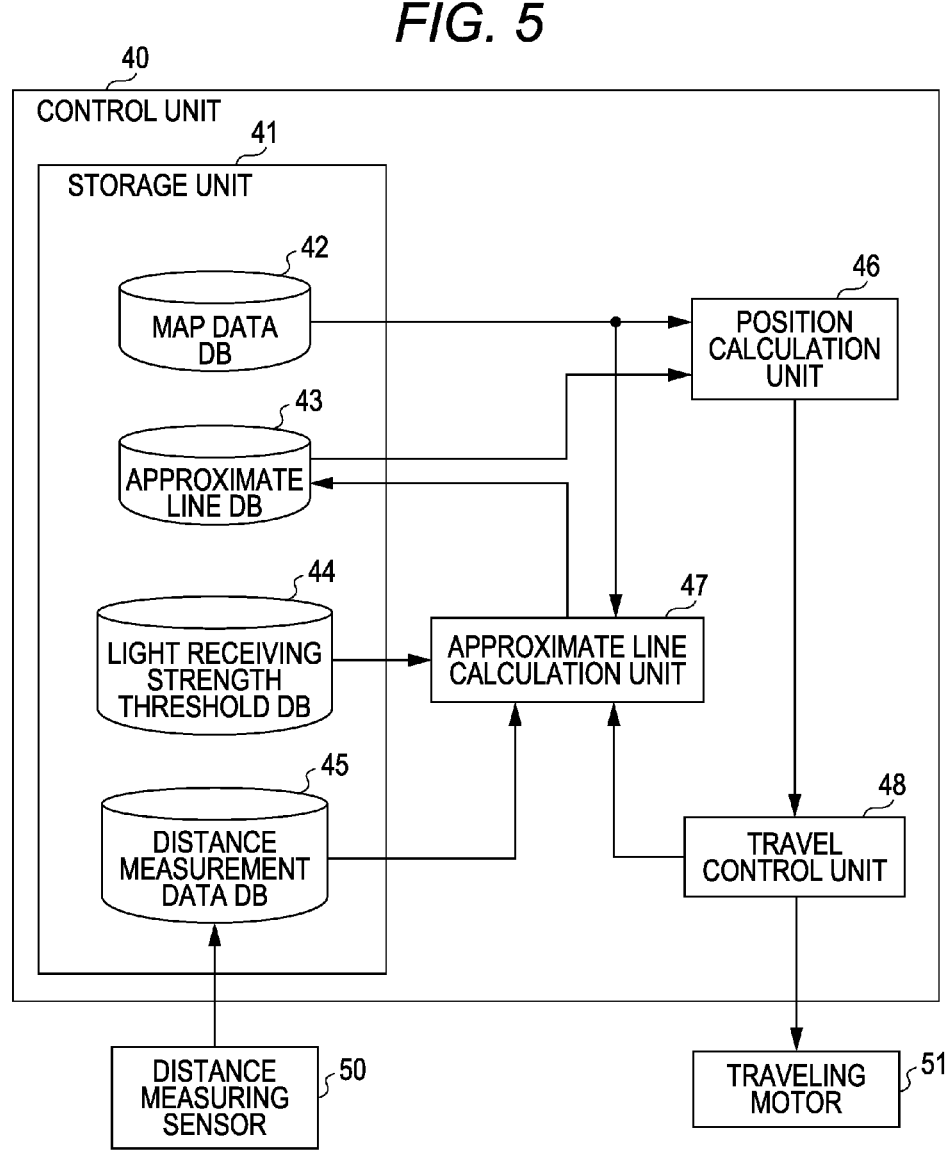
FIG. 5 is a configuration view illustrating a control configuration of the carrier.

The carrier 3 mainly includes a carrier main body 3a, a distance measuring sensor 50, and a control unit 40 (refer to FIG. 5). A traveling motor 51 (refer to FIG. 5) and traveling wheels 3b are provided on the carrier main body 3a. In FIG. 1, an example of the traveling direction of the carrier 3 is indicated by thick arrows.

(1-2) Column and Reflecting Plate of Rack

Figure 3:
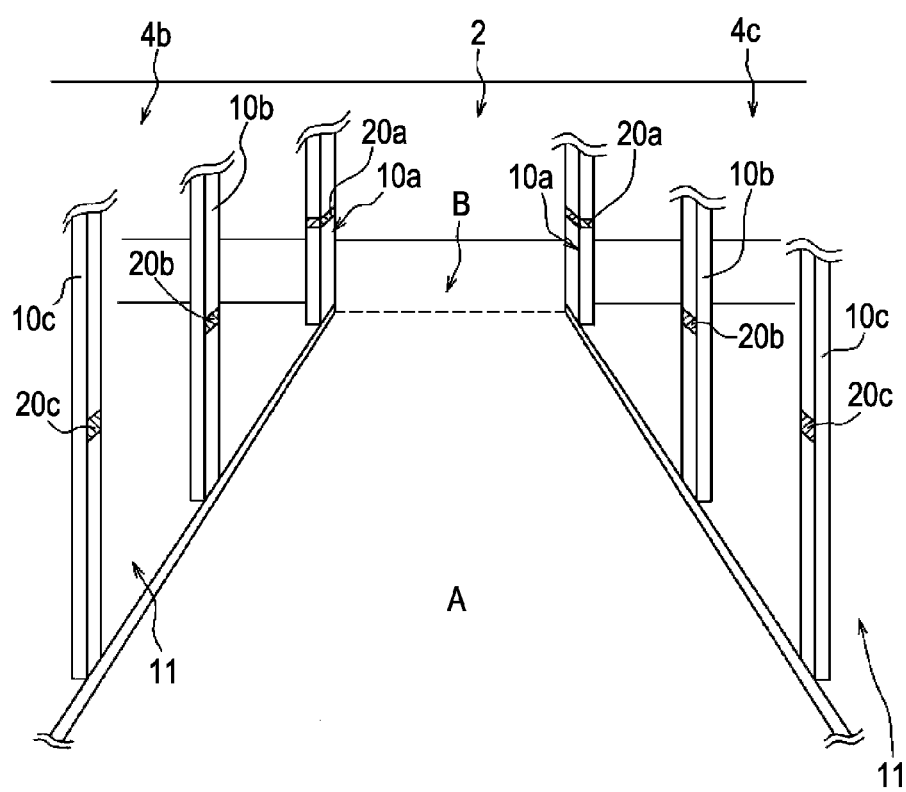
FIG. 3 is an explanatory view illustrating a reflecting plate which is provided on a column of the rack.
Figure 4A:
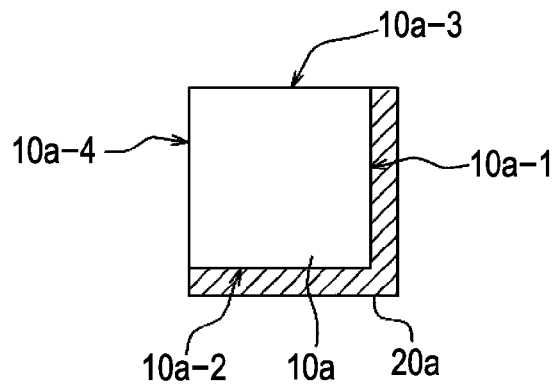
FIGS. 4A to 4C are enlarged views of the reflecting plate which is provided on the column of the rack.
Figure 4B:
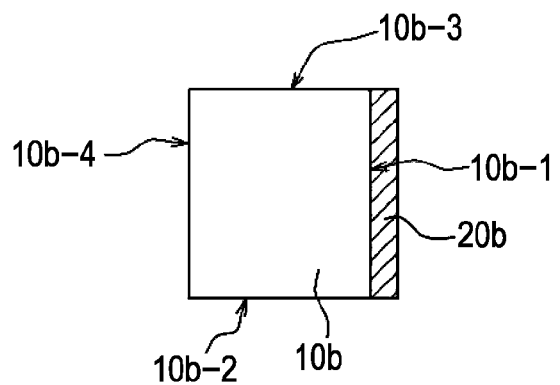
Figure 4C:
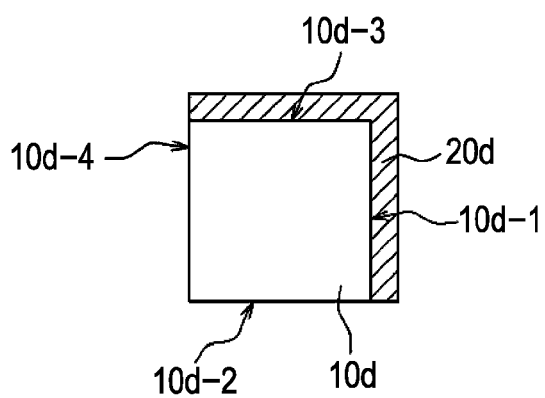

Next, the column and a reflecting plate 20 of the rack 4 will be described with reference to FIGS. 3 and 4C. FIG. 3 is an explanatory view illustrating a reflecting plate which is provided on the column of the rack. FIGS. 4A to 4C are enlarged views of the reflecting plate which is provided on the column of the rack, FIG. 4A is an enlarged view of a column 10a, and FIG. 4B is an enlarged view of a column 10b.

As illustrated in FIG. 3, the first area A is between the rack 4b and the rack 4c, and the second area B is between the racks 4b and 4c and the wall 2. The columns 10a, 10b, 10c . . . of the racks 4b and 4c are provided so as to face the first area A. The column 10a is positioned in the end of the racks 4b and 4c.

For example, as illustrated in FIGS. 3 to 4C, the column 10 of the rack 4 is formed in a square shape having four surfaces, and the one side is parallel to the extension direction of the first area A. The positions in which the reflecting plates 20 are provided are various. However, for example, there may be a case where the reflecting plate 20 is provided at least on the surface opposite to the first area A or a case where the reflecting plate 20 is provided only on the surface opposite to the first area A.

As an example, in the column 10a which is positioned in the end of the rack 4, the reflecting plate 20a is provided on two surfaces in which the carrier 3 traveling on the first area A can detect the reflected light. Specifically, as illustrated in FIG. 4A, the column 10a which is positioned in the end of the rack 4 includes a first surface 10a-1, a second surface 10a-2, a third surface 10a-3, and a fourth surface 10a-4. The first surface 10a-1 is a surface parallel to the extension direction of the first area A and the third surface 10a-3 is a surface opposite to the second area B. The reflecting plate 20a is provided on the first surface 10a-1 and the second surface 10a-2 and is not provided on the third surface 10a-3 and the fourth surface 10a-4.

Moreover, in the columns 10b, 10c . . . which are positioned other than the end of the rack 4, the reflecting plates 20b, 20c, . . . are provided only on one surface opposite to the first area A. Specifically, as illustrated in FIG. 4B, the column 10b includes a first surface 10b-1, a second surface 10b-2, a third surface 10b-3, and a fourth surface 10b-4. The first surface 10b-1 is a surface parallel to the extension direction of the first area A. The reflecting plate 20b is provided only on the first surface 10b-1 and is not provided on the second surface 10b-2, the third surface 10b-3, and the fourth surface 10b-4.

Moreover, as illustrated in FIG. 4C, the column 10d which is provided on the end opposite to the column 10a includes a first surface 10d-1, a second surface 10d-2, a third surface 10d-3, and a fourth surface 10d-4. The first surface 10d-1 is a surface parallel to the extension direction of the first area A and the second surface 10d-2 is a surface opposite to the second area B. The reflecting plate 20d is provided on the first surface 10d-1 and the third surface 10d-3 and is not provided on the second surface 10d-2 and the fourth surface 10d-4.

(2) Control Configuration of Carrier

Next, the control configuration of the carrier 3 will be described with reference to FIGS. 1 and 5. FIG. 5 is a configuration view illustrating the control configuration of the carrier.

The carrier 3 includes the control unit 40 as a function unit. The control unit 40 is a computer including a CPU, a RAM, and a ROM, and achieves a travel control by performing a predetermined program. The distance measuring sensor 50, the traveling motor 51, and the like are connected to the control unit 40.

The distance measuring sensor 50 is a sensor for detecting obstacles which are positioned at the front side in the traveling direction of the carrier 3. The distance measuring sensor 50 is a laser range finder, sends laser pulse signals to a target by a laser emitter, receives the laser pulse signals which are reflected from the target through a laser receiver, and calculates the distance based on the reflected laser pulse signals. The distance measuring sensor 50 can apply the emitted laser in the horizontal direction in a fan shape of an approximately 270° in the front of the carrier main body 3a by reflecting the emitted laser through a rotating mirror. For example, the scan period of the laser range finder is 25 to 100 msec intervals.

The traveling motor 51 imparts driving force to the traveling wheels 3b and is a driving portion which enables the carrier main body 3a to travel.

The control unit 40 includes a storage unit 41, a position calculation unit 46, an approximate line calculation unit 47, and a travel control unit 48. In addition, the storage unit 41 includes a map data DB (Data Base) 42, an approximate line DB 43, a light receiving intensity threshold DB 44, and a distance measurement data DB 45.

The map data DB 42 stores map data which describes at least the position of the column 10 of the rack 4. In addition, the position of the wall 2 may be described in the map data.

The approximate line DB 43 stores the approximate line which is calculated by the approximate line calculation unit 47.

The light receiving intensity threshold DB 44 stores the light receiving intensity threshold for distinguishing the reflected light from the reflecting plate 20 or the reflected light from other than the reflecting plate 20.

The distance measurement data DB 45 stores measured data which indicates the light receiving intensity of the reflected light measured by the distance measuring sensor 50.

The approximate line calculation unit 47 has a function which calculates the approximate line based on the measured data measured by the distance measuring sensor 50.

The position calculation unit 46 specifies a current position of the carrier main body 3a by comparing the calculated approximate line and the map data. Thereby, the position calculation unit 46 has a function which correctly grasps the current position of the carrier 3.

The travel control unit 48 has a function which controls the traveling motor 51 based on the given travel command and the current position.

Hereinafter, the operation of the function unit of the carrier 3 will be described in detail along with descriptions of a position calculation method of the carrier 3.

(3) Position Calculation Method of Carrier (3-1) Measurement of Reflected Light

Figure 6:
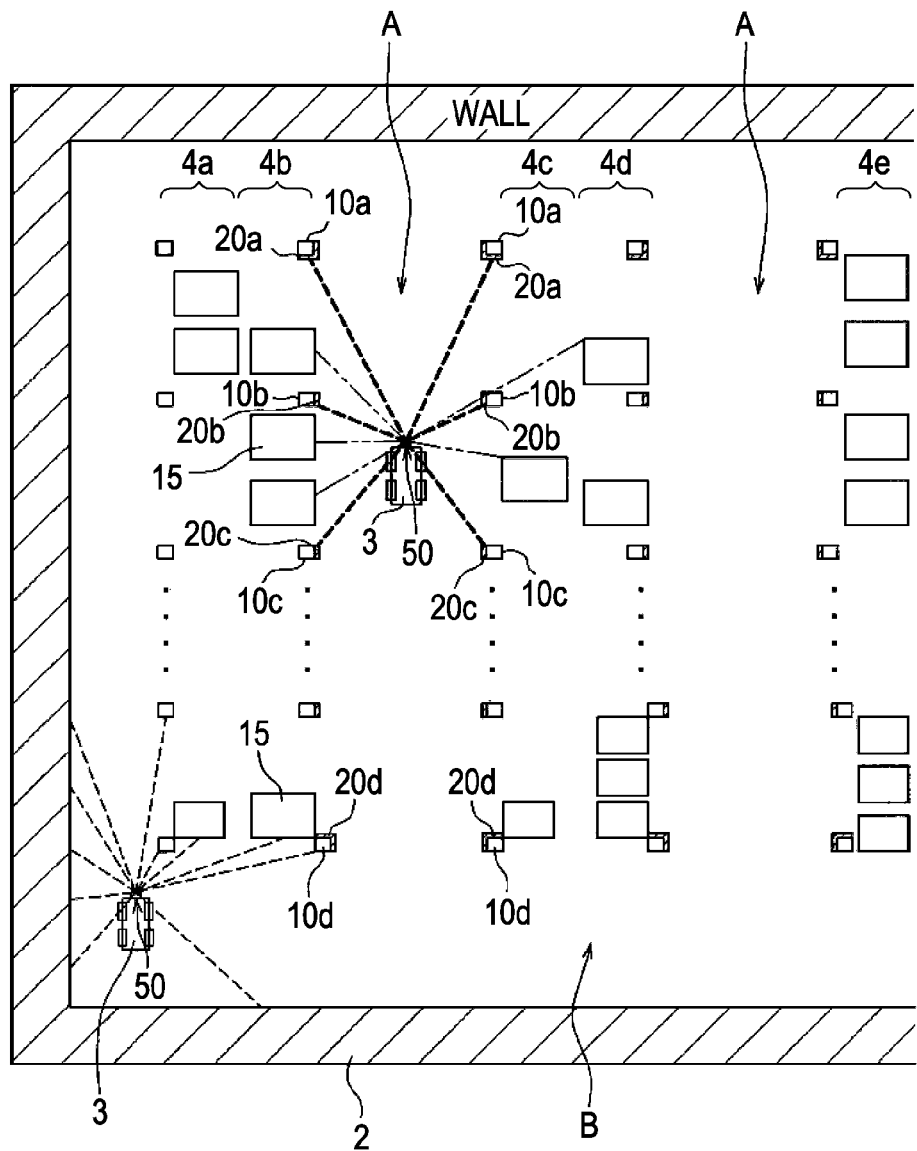
FIG. 6 is an explanatory view illustrating a state where reflected light is measured by a distance measuring sensor 50.

The distance measuring sensor 50 applies light and measures the light receiving intensity of all reflected light. FIG. 6 is an explanatory view illustrating a state where the reflected light is measured by the distance measuring sensor 50. In not only the case where the carrier 3 travels on the first area A but also the case where the carrier 3 travels on the second area B, the distance measuring sensor 50 applies the light in the range of an approximately 270° and measures the reflected light. For example, the distance measuring sensor 50 measures the light receiving intensity of all the reflected light such as the reflected light from the wall 2, the column 10, the reflecting plate 20, and the load 15.

The distance measurement data DB 45 stores the light receiving intensity of the reflected light which is measured by the distance measuring sensor 50 as measurement data.

(3-2) Calculation of Approximate Line
(a) Determination of Area

First, based on the map data of the map data DB 42 and the travel data from the travel control unit 48, the approximate line calculation unit 47 specifies which of the first area A and the second area B the carrier 3 travels. For example, the approximate line calculation unit 47 determines which area the carrier 3 is positioned with respect to the initial position in the map data based on travel data including the speed, the traveling direction, and the like.

(b) Calculation of Approximate Line for Each Area

In a case where it is determined that the carrier 3 is positioned in the first area A, the approximate line calculation unit 47 selects measured data which has an intensity of the light equal to or more than a predetermined threshold among the plurality of pieces of measured data. The approximate line calculation unit 47 calculates the approximate line based on the set of the pieces of selected measured data.

On the other hand, in a case where it is determined that the carrier 3 is positioned in the second area B, the approximate line calculation unit 47 does not select measured data and calculates the approximate line using all pieces of measured data. The second area B is a pathway which faces the wall 2, and the distance measuring sensor 50 mainly measures the intensity of the reflected light from the wall 2. Accordingly, the approximate line calculation unit 47 can calculate the approximate line corresponding to the wall 2. Moreover, the approximate line calculation unit 47 may calculate the approximate line using only the measured data along the wall 2 in the map data instead of using all pieces of measured data.

(c) Detail Description of Approximate Line Calculation in First Area A

Figure 7A:
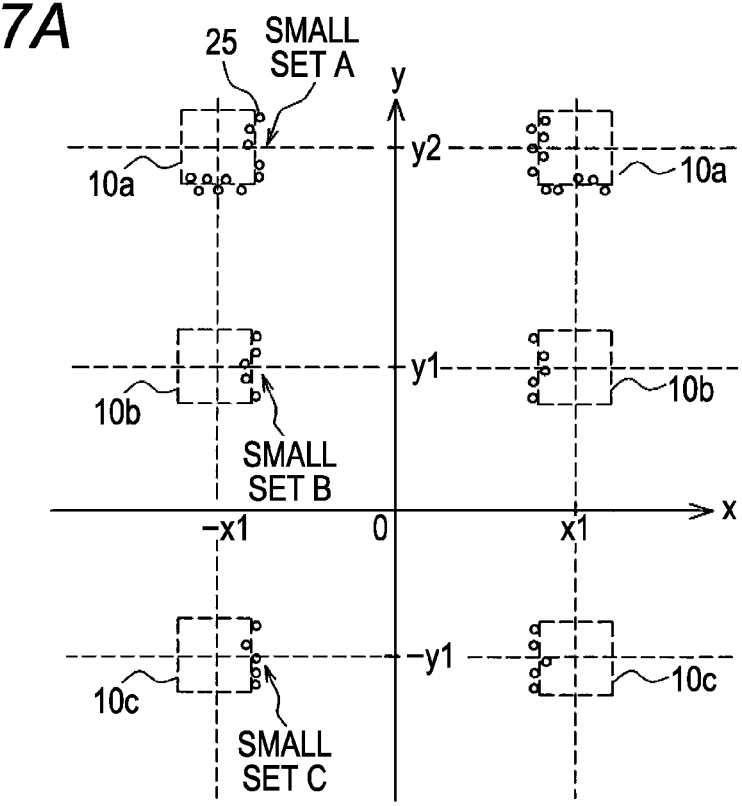
FIGS. 7A and 7B are explanatory views illustrating a set of pieces of measured data which are used in calculation of an approximate line in a first area A.
Figure 7B:
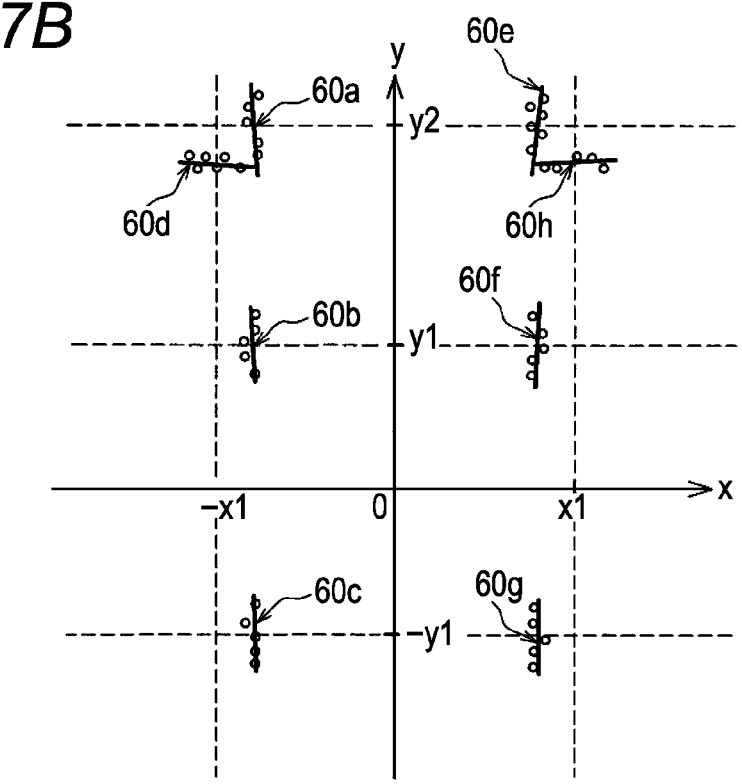

Next, the calculation method of the approximate line in the first area A will be specifically described below with reference to FIGS. 6 to 7B. FIGS. 7A and 7B are explanatory views illustrating a set of pieces of measured data which are used in calculation of the approximate line in the first area A, FIG. 7A is the explanatory view illustrating small sets of the measured data, and FIG. 7B is the explanatory view illustrating the approximate line of each of the small sets.

As illustrated in FIG. 6, the carrier 3 travels on the first area A. At this time, the distance measuring sensor 50 measures the intensity of all the reflected light. For example, the reflected light from the reflecting plates 20a, 20b, and 20c of the racks 4b and 4c, the load 15, and the like is measured, and the measured reflected light is stored in the distance measurement data DB 45.

Since the carrier 3 travels on the first area A, the approximate line calculation unit 47 reads a predetermined threshold from the light receiving intensity threshold DB 44. Here, the predetermined threshold is a value for determining whether or not the received light is the light which is reflected from the reflecting plate 20.

The approximate line calculation unit 47 selects the measured data which is equal to or more than the predetermined threshold by comparing the measured data of the distance measurement data DB 45 and the predetermined threshold. That is, as illustrated in FIG. 6, only the measured data with respect to the light reflected from the reflecting plates 20a, 20b, and 20c of the racks 4b and 4c is extracted (refer to thick dashed lines of FIG. 6). For example, the measured data which is equal to or more than the selected predetermined threshold is distributed as illustrated in FIG. 7A.

According to FIG. 7A, a plurality of pieces of measured data 25 are distributed along the reflecting plate 20 of the column 10. Moreover, in FIGS. 7A and 7B, a y direction is a direction along the extension direction of the first area A, and an x direction is a direction perpendicular to the y direction. The origin of "0" in x and y indicates the position of the carrier 3. The position of x1 in the x coordinate corresponds to the column 10 of the rack 4c, the position of (x1, y2) corresponds to the column 10a, the position of (x1, y1) corresponds to the column 10b, and the position of (x1,-y1) corresponds to the column 10c. Moreover, the position of -x1 in the x coordinate corresponds to the column 10 of the rack 4b, the position of (-x1, y2) corresponds to the column 10a, the position of (-x1, y1) corresponds to the column 10b, and the position of (-x1,-y1) corresponds to the column 10c.

In FIG. 7A, small sets A, B, and C corresponding to the columns 10a, 10b, and 10c of the rack 4b are illustrated as the small set of the pieces of measured data 25 which is equal to or more than the predetermined threshold. Since the reflecting plate 20 is provided on two surfaces in the column 10a, the measured data 25 is distributed along two surfaces of the column 10a. Since the reflecting plate 20 is provided on only one surface in the columns 10b and 10c, the measured data 25 is distributed along the one surface of the columns 10b and 10c. Here, similar to the columns 10 being separated from one another by a predetermined distance, the small sets are separated from one another by a predetermined distance respectively. The approximate line calculation unit 47 calculates the approximate line using the measured data which is included in the set including the small sets A, B, and C.

For example, the approximate line calculation unit 47 reads the positions of each of the columns 10a, 10b, and 10c of the rack 4b from the map data DB 42, and the measured data 25 which approaches and corresponds to each of the columns 10a, 10b, and 10c of the rack 4b is set to each of the small sets A, B, and C. In addition, the approximate line calculation unit 47 calculates the approximate line 60 for each of the small sets A, B, and C. At this time, as illustrated in FIG. 7B, the approximate line calculation unit 47 calculates two approximate lines 60a and 60d along two surfaces with respect to the column 10a of the rack 4b. Moreover, the approximate line calculation unit 47 calculates approximate lines 60b and 60c with respect to the column 10b and 10c of the rack 4b respectively. Similarly, the approximate line calculation unit 47 calculates approximate lines 60e and 60h with respect to the column 10a of the rack 4c and calculates approximate lines 60f and 60g with respect to the column 10b and 10c of the rack 4c respectively.

Next, the approximate line calculation unit 47 considers a plurality of small sets, in which the extension directions of the approximate lines 60 are the approximately same direction, the x coordinates are the same degree, and the distances are near, as one set. Here, the x coordinates of the approximate lines 60a, 60b, 60c, and 60d are in the vicinity of -x1 and have the same degree. However, the extension directions of the approximate lines 60a, 60b, and 60c are different from that of the approximate line 60d. Therefore, the measured data 25 which is used in the calculation of the approximate line 60d is excluded from the small set A. Thereby, only the measured data 25 along the approximate line 60 is included in the small set A. Moreover, the small sets A, B, and C in which the y coordinates are -y1, y1, and y2 and the distances are near are considered as one set. The approximate line calculation unit 47 calculates the approximate line 62 along each of the columns 10a, 10b, and 10c of the rack 4b based on the measured data 25 along the approximate lines 60a, 60b, and 60c which are included in the one set. Similarly, the approximate line calculation unit 47 considers the measured data 25 along approximate lines 60e, 60f, and 60g as one set and calculates the approximate line 62 along each of the columns 10a, 10b, and 10c of the rack 4c based on the measured data.

The approximate line calculation unit 47 stores the calculated approximate line in the approximate line DB 43.

(d) Error of Approximate Line

FIGS. 8A to 8C are explanatory views explaining an error of the approximate line in the first area A, FIG. 8A is a relationship view between the column and the measured data, FIG. 8B is the approximate line for each column, and FIG. 8C is the approximate line corresponding to a plurality of columns.

As illustrated in FIG. 8A, the plurality of pieces of measured data 25 corresponding to the column 10a are extracted. Similarly, the plurality of pieces of measured data 25 corresponding to the column 10b are extracted. Moreover, if each of the approximate lines 60a and 60b for each of the columns 10a and 10b is calculated, the calculated approximate lines becomes the lines illustrated in FIG. 8B. On the other hand, if the approximate line 62 is calculated using the measured data 25 of both columns 10a and 10b, the approximate line 37 becomes the line illustrate in FIG. 8C. Since the line of FIG. 8C is the closer calculation of the approximate line along the columns 10a and 10b than the line of FIG. 8B, it is found that the errors of FIG. 8C are smaller than those of FIG. 8B.

As illustrated in FIG. 8B, when the approximate line is calculated using only one small set, one point of measured data greatly influences the extension direction of the approximate line, that is, the inclination. This is because only limited range of measured data with respect to the extension direction of the approximate line is included in one small set. Thereby, even when only one of the measured data has an error, the approximate line has a great error. Therefore, in order to solve the problem, in the carrier 3 of the present preferred embodiment, the approximate line is calculated using the plurality of small sets which are separated from one another by equal to or more than a predetermined distance and using the measured data included in each of the small sets. In this way, since the plurality of pieces of measured data having the positions separated from one another are used, the influence of the measured data having errors to the inclination of the approximate line is decreased, and accuracy of the approximate line can be improved.

(3-3) Calculation of Current Position

Figure 9:
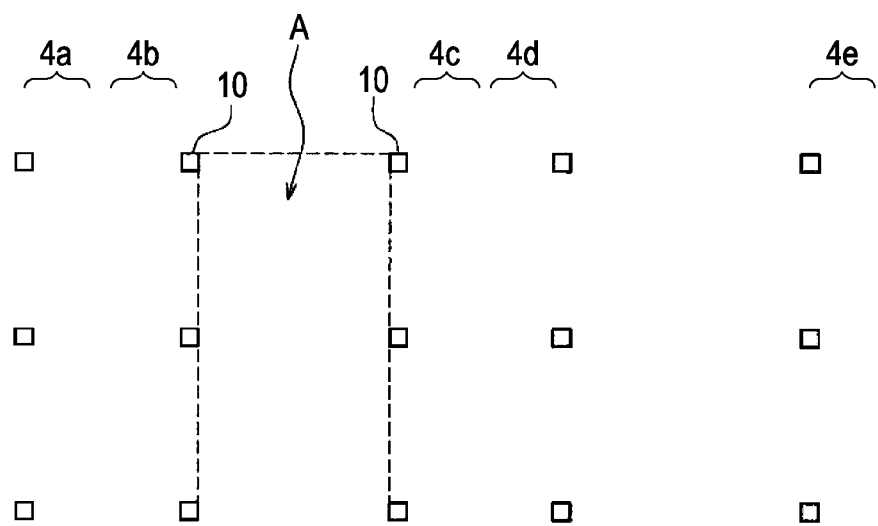
FIG. 9 is an explanatory view illustrating the disposition of the columns in map data.
Figure 10:
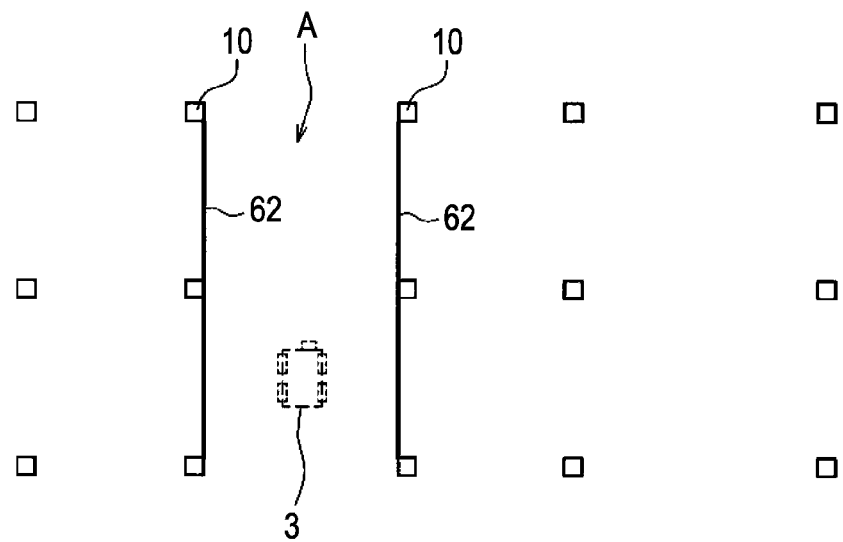
FIG. 10 is an explanatory view illustrating collation between the approximate line and the map data.

Next, a calculation method of the current position of the carrier main body 3a will be described with reference to FIGS. 9 and 10. FIG. 9 is an explanatory view illustrating the disposition of the columns in the map data. FIG. 10 is an explanatory view illustrating collation between the approximate line and the map data.

The position calculation unit 46 reads the map data from the map data DB 42. The map data includes data which indicates the disposition of at least each column 10 as illustrated in FIG. 9. In FIG. 9, the first area A is between the column 10 of the rack 4b and the column 10 of the rack 4c.

Moreover, the position calculation unit 46 reads the latest calculated approximate line from the approximate line DB 43. In addition, as illustrated in FIG. 10, the position calculation unit 46 collates the approximate line and the map data. That is, the approximate line 62 and the column 10 of the map data are fitted so as to coincide with each other. The position calculation unit 46 calculates the current position of the carrier main body 3a based on the collated results. Thereby, the current position of the carrier 3 which travels on the first area A can be correctly specified.

The travel control unit 48 controls the traveling motor 51 based on the calculated current position and the travel command, and then causes the carrier 3 to travel.

(4) Effects of the Present Preferred Embodiment

As described above, the first area A may be an area in which the peripheral environment of the pathway is easily changed and which is between racks for placing the loads. Since various large and small loads are put in and out the rack, the peripheral environment of the pathway is changed according to the presence or absence of the load, the size of the load, and the like in the first area A. Thereby, the measured data obtained by the distance measuring sensor may also be changed at the time of the measurement according to the peripheral environment such as the load. Therefore, for example, the reflecting plate which reflects the light with an intensity equal to or more than the predetermined threshold is provided along the pathway in the first area A.

In the first area A in which the peripheral environmental is easily changed, the approximate line calculation unit 47 calculates the approximate line based on the set of the pieces of measured data which has an intensity equal to or more than the predetermined threshold. That is, when the carrier travels on the first area A, the approximate line calculation unit 47 calculates the approximate line based on only the measured data which detects the reflected light from the reflecting plate 20. Even when the peripheral environment of the pathway is changed according to the presence or absence of the load, the size of the load, and the like, the reflected light from the reflecting plate 20 is not easily subjected to the influence due to the change of the peripheral environment. In this way, since the approximate line which indicates the pathway is calculated by only the measured data which is not easily subjected to the influence of the peripheral environment, the pathway information can be correctly calculated.

On the other hand, the second area B may be an area in which the change of the peripheral environment of the pathway is small and which includes the wall and the like. The reflecting plate 20 is not provided in the second area B, and the light is reflected with an intensity smaller than the predetermined threshold. Moreover, when the carrier travels on the second area B, the approximate line calculation unit 47 calculates the approximate line based on all the pieces of measured data which are measured by the distance measuring sensor 50. Compared to the first area A, the change of the peripheral environment is smaller in the second area B, and it is not necessary to limit the measured data for calculating the approximate line to predetermined data.

As described above, since the approximate line is calculated in each of the first area A and the second area B, the approximate line having high accuracy according to the peripheral environment can be calculated. Therefore, pathway information is correctly obtained even when the peripheral environment is changed, and the position of the carrier main body can be correctly calculated.

(5) Flow of Processing

Figure 11:
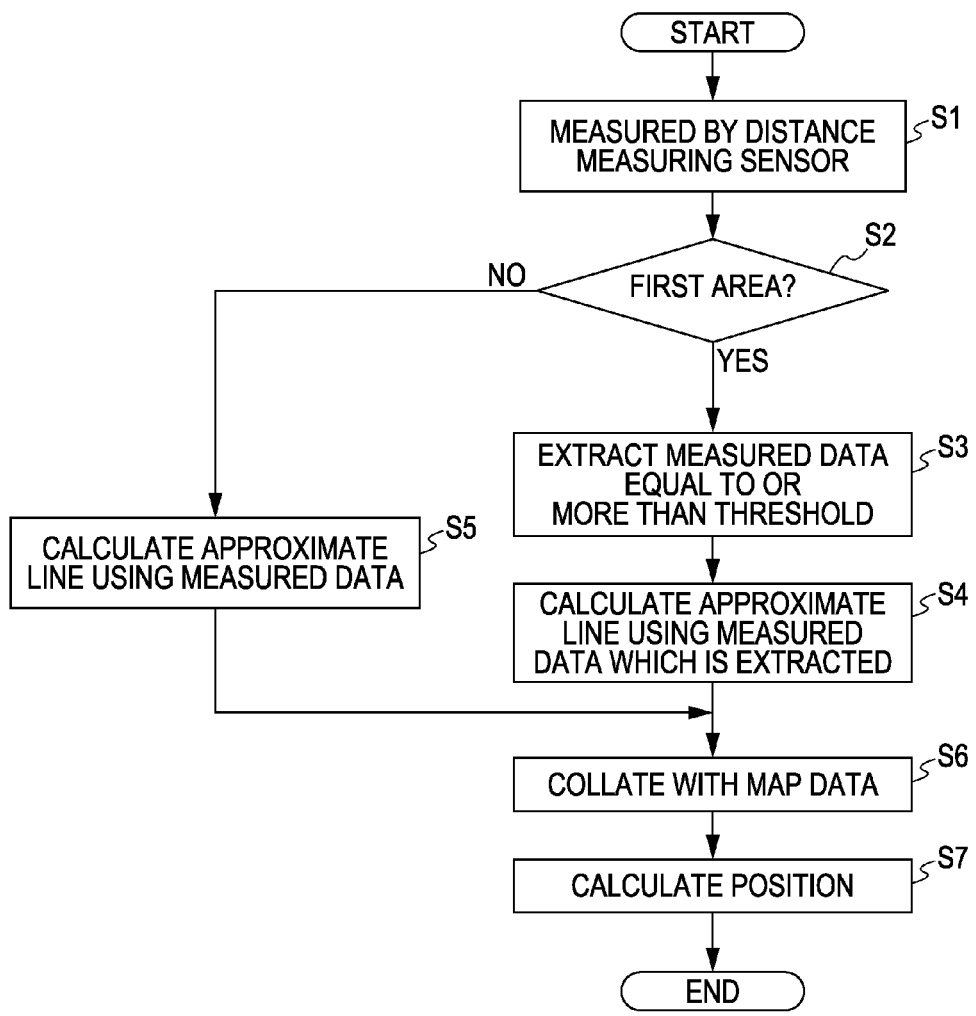
FIG. 11 is an example of a flow chart illustrating the flow of processing of the present preferred embodiment.

FIG. 11 is an example of a flow chart illustrating the flow of processing of the present preferred embodiment.

Step S1: the distance measuring sensor 50 applies light, measures the light receiving intensity of all the reflected light, and stores the measured intensity in the distance measurement data DB 45.

Step S2: the approximate line calculation unit 47 determines that the carrier 3 is positioned in any one of the first area A and the second area B based on the map data, the travel data, and the like. It proceeds to a step S3 when the carrier 3 is positioned in the first area A, and it proceeds to a step S5 when the carrier 3 is positioned in the second area B.

Step S3: in the first area A, the approximate line calculation unit 47 compares the predetermined threshold of the light receiving intensity threshold DB 44 and the measured data, and extracts the measured data equal to or more than the predetermined threshold.

Step S4: the approximate line calculation unit 47 calculates the approximate line using the measured data which is extracted and stores the measured data in the approximate line DB 43.

Step S5: in the second area B, the approximate line calculation unit 47 calculates the approximate line using all pieces of measured data without selecting the measured data.

Step S6: the position calculation unit 46 collates the map data of the map data DB 42 and the approximate line.

Step S7: the position calculation unit 46 calculates the current position of the carrier main body 3a based on the collated results.

(6) Effects of Preferred Embodiment

The above-described preferred embodiment can be represented as follows.

(A) The carrier 3 (an example of a carrier) includes the carrier main body 3a (an example of a carrier main body), the distance measuring sensor 50 (an example of a distance measuring sensor), the map data DB 42 (an example of a map data storage unit), the approximate line calculation unit 47 (an example of an approximate line calculation unit), and the position calculation unit 46 (an example of a position calculation unit).

The carrier main body 3a travels on the pathway including the first area A and the second area B other than the first area A.

The distance measuring sensor 50 is provided in the carrier main body 3a, measures the intensity of the reflected light a plurality of times, and obtains the plurality of pieces of measured data.

The map data DB 42 stores the map data in which the structures provided along the pathway are recorded.

The approximate line calculation unit 47 calculates the approximate line based on the set of the pieces of measured data having the light intensity equal to or more than the predetermined threshold among the plurality of pieces of measured data in the first area A, and the approximate line calculation unit 47 calculates the approximate line based on the set of the plurality of pieces of measured data in the second area B.

The position calculation unit 46 calculates the position of the carrier main body 3a by collating the approximate line and the map data.

The pathway includes the first area A and the second area B other than the first area A.

For example, the first area A may be an area in which the peripheral environment of the pathway is easily changed and which is between racks for placing the loads. Since various large and small loads are put in and out the rack, the peripheral environment of the pathway is changed according to the presence or absence of the load, the size of the load, and the like in the first area A. Thereby, the measured data obtained by the distance measuring sensor 50 may also be changed at the time of the measurement according to the peripheral environment such as the load. Therefore, for example, the reflecting plate 20 which reflects the light with an intensity equal to or more than the predetermined threshold is provided along the pathway in the first area A.

In the first area A in which the peripheral environmental is easily changed, the approximate line calculation unit 47 calculates the approximate line based on the set of the pieces of measured data which has an intensity equal to or more than the predetermined threshold. That is, when the carrier travels on the first area A, the approximate line calculation unit 47 calculates the approximate line based on only the measured data which detects the reflected light from the reflecting plate 20. Even when the peripheral environment of the pathway is changed according to the presence or absence of the load, the size of the load, and the like, the reflected light from the reflecting plate 20 is not easily subjected to the influence due to the change of the peripheral environment. In this way, since the approximate line which indicates the pathway is calculated by only the measured data which is not easily subjected to the influence of the peripheral environment, the pathway information can be correctly calculated.

On the other hand, for example, the second area B may be an area in which the change of the peripheral environment of the pathway is small and which includes the wall and the like. The reflecting plate 20 is not provided in the second area B, and the light is reflected with an intensity smaller than the predetermined threshold. Moreover, when the carrier travels on the second area B, the approximate line calculation unit 47 calculates the approximate line based on all the pieces of measured data which are measured by the distance measuring sensor 50. Compared to the first area A, the change of the peripheral environment is smaller in the second area B, and it is not necessary to limit the measured data for calculating the approximate line to predetermined data.

As described above, since the approximate line is calculated in each of the first area A and the second area B, the approximate line having high accuracy according to the peripheral environment can be calculated. Therefore, the pathway information is correctly obtained even when the peripheral environment is changed, and the position of the carrier main body 3a can be correctly calculated.

(B) The set of the pieces of measured data having the light intensity equal to or more than the predetermined threshold includes the plurality of small sets which are separated from one another, and at least one of the measured data is included in each small set.

When the approximate line is calculated using only one small set, one point of measured data greatly influences the extension direction of the approximate line, that is, the inclination. This is because only limited range of measured data with respect to the extension direction of the approximate line is included in one small set. Thereby, even when only one of the measured data has an error, the approximate line has a great error. Therefore, the approximate line is calculated using the plurality of small sets which are separated from one another and using the measured data included in each of the small sets. In this way, since the plurality of pieces of measured data having the positions separated from one another are used, the influence of the measured data having errors to the inclination of the approximate line is decreased, and accuracy of the approximate line can be improved.

(C) A plurality of columns 10 (an example of a structure) are provided along the pathway in the first area A, and the reflecting plates 20 (an example of a reflecting plate) which reflect the light with an intensity equal to or more than the predetermined threshold are provided on each of the columns 10 respectively.

For example, the structure may be the columns 10 of the rack which are provided with a predetermined interval. The approximate line calculation unit 47 calculates the approximate line based on the measured data from the reflecting plate 20 which is provided on each column 10. The approximate line indicates the positional data of the column 10. The position calculation unit 46 can calculate the position of the carrier main body 3a by collating the approximate line which indicates the positional data of the column 10 and the map data which records the column 10.

(D) The reflecting plate 20 is provided only on the surface opposite to the first area A of the structure.

The reflecting plate 20 is provided at least on the surface opposite to the first area A. Thereby, the reflected light which is reflected by the reflecting plate 20 and has an intensity equal to or more than the predetermined threshold can be detected in the first area A. Moreover, the measured data of the light reflected by the reflecting plate 20 is selected among the plurality of pieces of measured data based on the predetermined threshold and can be used for the calculation of the approximate line. On the other hand, since all the pieces of measured data are used for the calculation of the approximate line in the second area B, it is not necessary to select the measured data based on the predetermined threshold.

(7) Other Preferred Embodiment

As described above, a preferred embodiment of the present invention is explained. However, the present invention is not limited to the above-described preferred embodiment, and various modifications can be performed within the scope which does not depart from the gist of the invention. Particularly, a plurality of preferred embodiments and modifications which are described in the present specification can be combined as desired according to necessity.

(a) In the above-described preferred embodiment, as illustrated in FIGS. 4A to 6, the column 10 of the rack 4 is a square shape which has four surfaces. Moreover, in the column 10a which is positioned in the end of the rack 4, the reflecting plate 20a is provided on two surfaces in which the carrier 3 traveling on the first area A can detect the reflected light. In addition, in the columns 10b, 10c . . . which are positioned other than the end of the rack 4, the reflecting plates 20b, 20c, . . . are provided only on one surface opposite to the first area A. However, the position in which the reflecting plate 20 is provided is not limited to the positions of FIGS. 4A to 4C and the like.

For example, in the column 10a of the end of the rack 4, similar to the column 10b illustrated in FIG. 4B, the reflecting plate 20 may be provided only on one surface opposite to the first area A.

Figure 12:
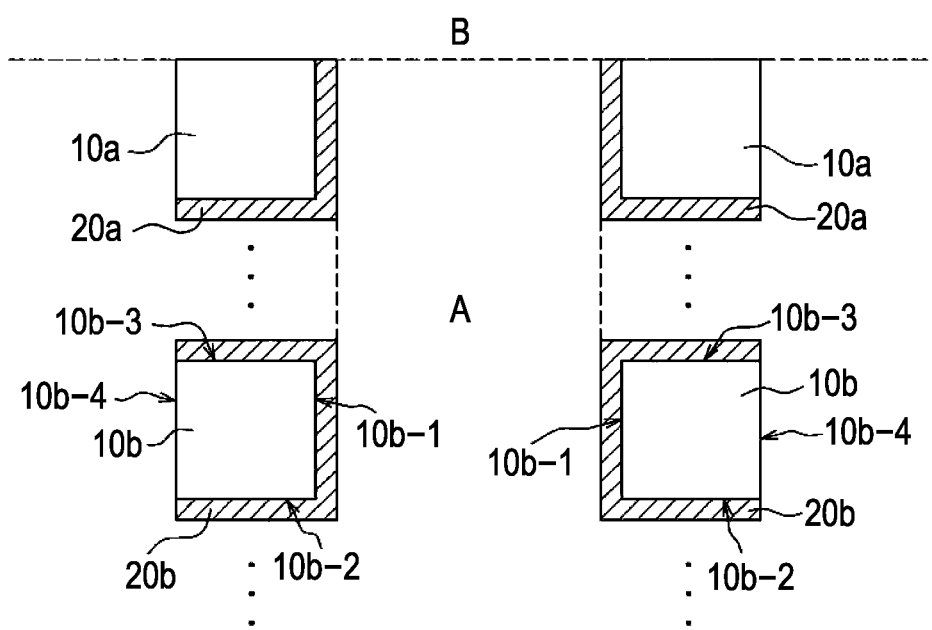
FIG. 12 is an explanatory view illustrating a state where the reflecting plates are provided on three surfaces in which the carrier of the first area A can detect reflected light.

Moreover, in the columns 10b, 10c . . . which are positioned other than the end of the rack 4, as illustrated in FIG. 12, the reflecting plate 20a may be provided on three surfaces in which the carrier 3 traveling on the first area A can detect the reflected light. FIG. 12 is an explanatory view illustrating a state where the reflecting plates are provided on three surfaces in which the carrier 3 of the first area A can detect reflected light. As illustrated in FIG. 12, in the column 10b, the reflecting plate 20b is provided on the first surface 10b-1, the second surface 10b-2, and the third surface 10b-3. The reflecting plate 20b is not provided on the fourth surface 10b-4 which is not opposite to the first area A. In addition, in the columns 10b, 10c . . . the reflecting plate 20a may be provided on any two surfaces among three surfaces in which the carrier 3 traveling on the first area A can detect the reflected light.

Figure 13:
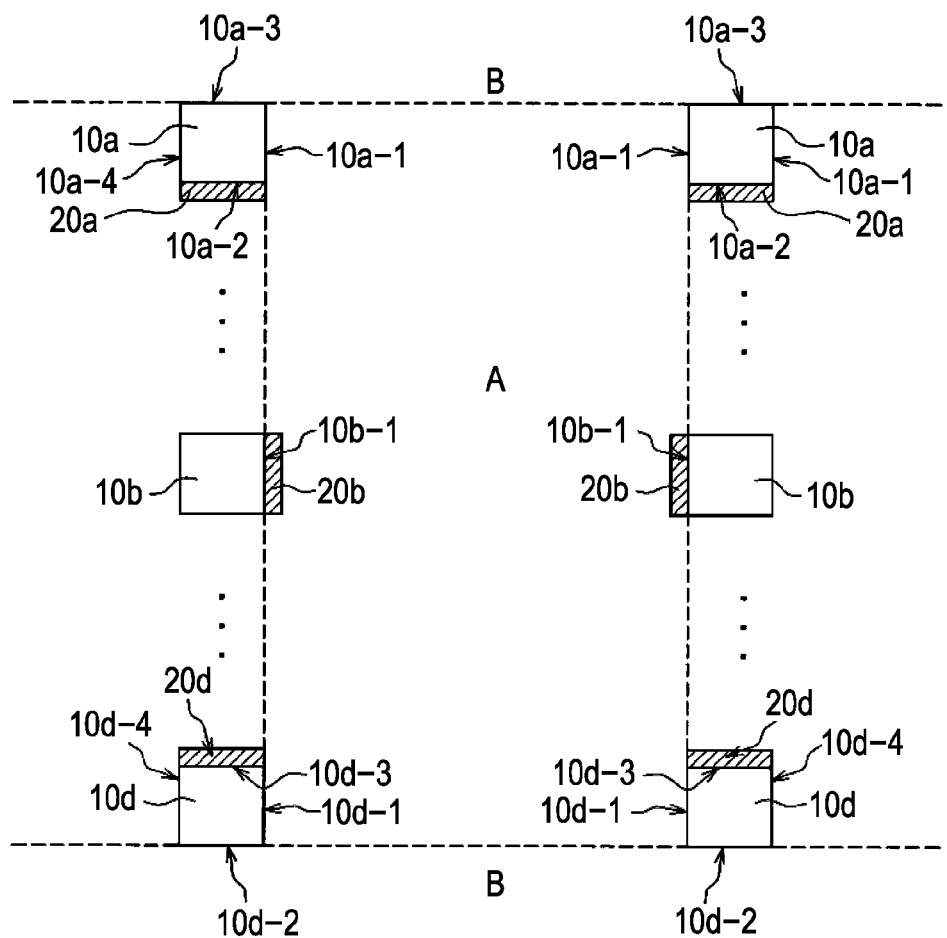
FIG. 13 is an explanatory view illustrating a modification of positions in which the reflecting plates are provided.

Moreover, as illustrated in FIG. 13, in the column 10a or the like of the end of the rack 4, the reflecting plate 20 may be provided in a position in which the carrier 3 traveling on the second area B cannot detect the reflected light from the reflecting plate 20. FIG. 13 is an explanatory view illustrating a modification of the position in which the reflecting plates are provided. In the column 10a of the end of the rack 4, the reflecting plate 20a is provided only on the second surface 10a-2. On the other hand, in the column 10d which is provided on the end opposite to the column 10a, the reflecting plate 20d is provided only on the third surface 10d-3. Thereby, the carrier 3 traveling on the second area B can correctly calculate the approximate line along the wall 2 based on only the reflected light of the wall 2 or the like. Moreover, also in the column 10 adjacent to the columns 10a and 10d of the end of the rack 4, the reflecting plate 20 may be disposed like the columns 10a and 10d of FIG. 13.

(b) In the above-described preferred embodiment, as illustrated in FIG. 4 or the like, the column 10 of the rack 4 is a square shape having four surfaces. However, the shape of the column 10 is not limited thereto. For example, the shape of the column may include various shapes such as a rectangular shape, a triangular shape, a circular shape, and an oval shape.

(c) When the carrier 3 travels on the boundary between the first area A and the second area B, the position of the carrier 3 may be calculated based on both the measured data from the reflecting plate 20 and the measured data from the wall 2 or the like. At this time, the distance measuring sensor 50 detects the light reflected from the reflecting plate 20 and the light reflected from the wall 2 or the like according to the scanning angle. The approximate line calculation unit 47 calculates the approximate line based on both the measured data equal to or more than the predetermined threshold which is reflected from the reflecting plate 20 and the measured data smaller than the predetermined threshold which is reflected from the wall 2 or the like. The position calculation unit 46 calculates the position of the carrier 3 based on both the measured data from the reflecting plate 20 and the measured data from the wall 2 or the like.

(d) In the above-described preferred embodiment, the distance measurement data DB 45 stores the light receiving intensity of all the reflected light which is measured by the distance measuring sensor 50. When it is determined that the carrier 3 is positioned in the first area A, the approximate line calculation unit 47 selects the measured data having the light intensity equal to or more than the predetermined threshold among the plurality of pieces of measured data. Moreover, the position of the carrier 3 is calculated based on the measured data which is selected. However, when the carrier 3 is positioned in the first area A, the distance measurement data DB 45 may not store the light receiving intensity smaller than the predetermined threshold. In addition, a filter which does not receive the reflected light of the light receiving intensity smaller than the predetermined threshold may be provided in the distance measuring sensor 50.

(e) In order to increase the accuracy of the approximate line, the approximate line calculation unit 47 selects only the measured data which is positioned within the predetermined range with respect to the position of the column 10, and may calculate the approximate line based on only the selected measured data. The approximate line having high accuracy can be calculated by excluding the measured data which is separated from the position of the column 10.

The present invention can be widely applied to a carrier which automatically travels on a travel pathway in which surrounding structures are present.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An autonomous warehouse carrier which automatically travels on a pathway, comprising:
    an autonomous warehouse carrier main body which travels on the pathway including a first area and a second area other than the first area, the first area including a rack having provided thereon a reflecting plate and the rack provided along the pathway, and the second area including a wall provided along the pathway;

a distance measuring sensor which is provided in the autonomous warehouse carrier main body, measures an intensity of reflected light a plurality of times, the reflected light being reflected from at least the reflecting plate, and obtains a plurality of pieces of measured data;

a map data storage unit which stores map data in which structures provided along the pathway are recorded;

an approximate line calculation unit which calculates an approximate line in the first area based on a set of pieces of measured data having the light intensity equal to or more than a predetermined threshold among the plurality of pieces of measured data in the first area and calculates an approximate line in the second area based on the plurality of pieces of measured data in the second area; and a position calculation unit which calculates a position of the autonomous warehouse carrier main body by collating the approximate line in the first area and the map data or the approximate line in the second area and the map data.

2. The autonomous warehouse carrier according to claim 1, further comprising:

a traveling motor which imparts driving force to traveling wheels and enables the autonomous warehouse carrier main body to travel; and a travel control unit which controls the traveling motor based on a given travel command and the calculated current position.

3. The autonomous warehouse carrier according to claim 1, wherein the set of the pieces of measured data having the light intensity equal to or more than the predetermined threshold includes a plurality of small sets which are separated from one another, and at least one piece of measured data is included in each of the plurality of small sets.

4. The autonomous warehouse carrier according to claim 3, wherein the approximate line calculation unit calculates the approximate line while having the plurality of small sets which are separated from one another define the set of the pieces of measured data.

5. The autonomous warehouse carrier according to claim 1, wherein a plurality of the structures in the first area are provided along the pathway, and the reflecting plate which reflects light with an intensity equal to or more than the predetermined threshold is provided on each structure.

6. The autonomous warehouse carrier according to claim 5, wherein the reflecting plate is provided only on a surface opposite to the first area of the structure.

7. The autonomous warehouse carrier according to claim 1, wherein the approximate line calculation unit calculates one approximate line based on the measured data from a plurality of the reflecting plates which are arranged on a column of the rack provided along the pathway.

8. A position calculation method of an autonomous warehouse carrier which automatically travels on a pathway, comprising:

a step of traveling the pathway including a first area and a second area other than the first area, the first area including a rack having provided thereon a reflecting plate and the rack provided along the pathway, and the second area including a wall provided along the pathway;

a step of measuring an intensity of reflected light a plurality of times by a distance measuring sensor provided in an autonomous warehouse carrier main body, the reflected light being reflected form at least the reflecting plate and obtaining a plurality of pieces of measured data;

a step of storing map data in which a structure provided along the pathway is recorded;

a step of calculating an approximate line in the first area based on a set of pieces of measured data having light intensity equal to or more than a predetermined threshold among the plurality of pieces of measured data in the first area and calculating an approximate line in the second area based on the plurality of pieces of measured data in the second area; and a step of calculating the position of the autonomous warehouse carrier main body by collating the approximate line in the first area and the map data or the approximate line in the second area and the map data.

* * * * *